(12) United States Patent
Balasubramanian et al.

(10) Patent No.: US 8,738,870 B1
(45) Date of Patent: May 27, 2014

(54) BLOCK BASED BACKUP

(75) Inventors: Shankar Balasubramanian, Bangalore (IN); Vladimir Mandic, San Jose, CA (US); Sriprasad Bhat Kasargod, Bellevue, WA (US); Anand Raj, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 384 days.

(21) Appl. No.: 13/250,637

(22) Filed: Sep. 30, 2011

(51) Int. Cl.
*G06F 12/00* (2006.01)
*G06F 12/16* (2006.01)

(52) U.S. Cl.
USPC ............ 711/161; 711/162; 711/163; 711/203

(58) Field of Classification Search
USPC .................. 711/161, 162, 163, 203
See application file for complete search history.

(56) References Cited

U.S. PATENT DOCUMENTS

| | | | |
|---|---|---|---|
| 7,165,154 B2 | 1/2007 | Coombs et al. | |
| 7,240,172 B2 | 7/2007 | Chong et al. | |
| 7,979,530 B1 | 7/2011 | Lee | |
| 8,041,888 B2 * | 10/2011 | Rajan et al. | 711/112 |
| 8,117,168 B1 | 2/2012 | Stringham | |
| 8,200,638 B1 | 6/2012 | Zheng et al. | |
| 8,406,141 B1 | 3/2013 | Couturier et al. | |
| 2004/0163009 A1 | 8/2004 | Goldstein et al. | |
| 2004/0243775 A1 | 12/2004 | Coulter et al. | |
| 2005/0021740 A1 | 1/2005 | Bar et al. | |
| 2005/0246397 A1 | 11/2005 | Edwards et al. | |
| 2006/0047726 A1 | 3/2006 | Okada et al. | |
| 2010/0011178 A1 | 1/2010 | Feathergill | |
| 2010/0070725 A1 | 3/2010 | Prahlad et al. | |
| 2010/0122248 A1 | 5/2010 | Robinson et al. | |
| 2010/0299368 A1 | 11/2010 | Hutchins et al. | |
| 2011/0047340 A1 | 2/2011 | Olson et al. | |
| 2011/0072224 A1 * | 3/2011 | Popovski et al. | 711/162 |
| 2011/0302502 A1 | 12/2011 | Hart et al. | |
| 2013/0055256 A1 * | 2/2013 | Banga et al. | 718/1 |

* cited by examiner

*Primary Examiner* — Yong Choe
(74) *Attorney, Agent, or Firm* — Theodore A. Chen; Krishnendu Gupta

(57) ABSTRACT

A method, article of manufacture, and apparatus for protecting data. In some embodiments, this includes taking a snapshot of a physical volume with a native snapshot program, reading the snapshot block by block, creating a blank virtual container on a deduplicated virtual storage device, and populating the blank virtual container block by block based on reading the snapshot.

7 Claims, 6 Drawing Sheets

BLOCK BASED BACKUP

CROSS REFERENCE TO RELATED APPLICATIONS

This application is related to co-pending U.S. patent application Ser. No. 13/250,593 for INCREMENTAL BLOCK BASED BACKUP and filed concurrently herewith, which is incorporated herein by reference for all purposes, and to co-pending U.S. patent application Ser. No. 13/250,620 for DISCOVERING NEW PHYSICAL MACHINES FOR PHYSICAL TO VIRTUAL CONVERSION and filed concurrently herewith, which is incorporated herein by reference for all purposes, and to co-pending U.S. patent application Ser. No. 13/250,692 for SYNTHETIC BLOCK BASED BACKUP and filed concurrently herewith, which is incorporated herein by reference for all purposes, and to co-pending U.S. patent application Ser. No. 13/250,717 for RECOVERY FROM BLOCK BASED PHYSICAL TO VIRTUAL CONVERSION and filed concurrently herewith, which is incorporated herein by reference for all purposes.

FIELD OF THE INVENTION

This invention relates generally to backup systems, and more particularly to systems and methods for protecting data using virtualization and deduplication.

BACKGROUND OF THE INVENTION

Several backup products exist in the market today. The nature of these products may vary, but their general purpose is to protect data. Some products may take snapshots of a volume and store the snapshot in a remote storage device.

Some products use a technique called deduplication. Deduplication typically involves identifying redundant data and removing the redundancy, resulting in potentially large storage savings.

Some products virtualize data, which eases the management of information technology resources. Virtualization typically involves creating a virtual version of computing resources, such as operating systems, storage devices, network resources, and processing resources, among others.

When implemented individually, such products provide much benefit to Information Technology (IT) managers. However, when IT managers desire multiple data protection technologies, such as deduplication and virtualization, such combinations are usually ad hoc and result in diminishing returns of investment. There is a need, therefore, for an improved method, article of manufacture, and apparatus for protecting data.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
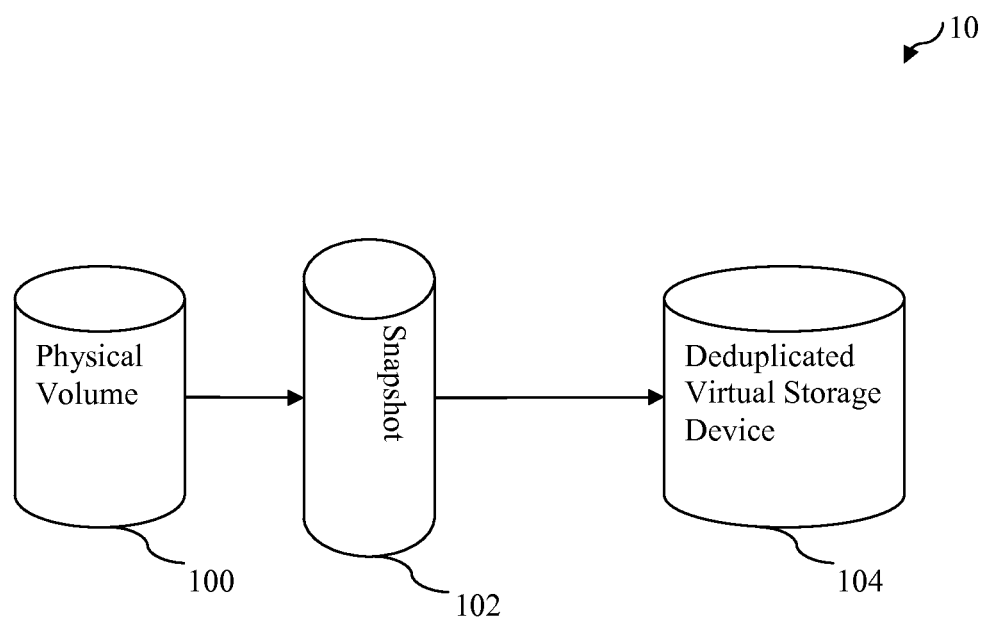
FIG. 1 is a diagram of a database in accordance with some embodiments.

FIG. 1 illustrates a data system in accordance with some embodiments. Data system 10 includes a physical volume 100, a snapshot 102, and a deduplicated virtual storage device 104. Physical volume 100 may be a production physical volume. For example, physical volume 100 may be a network attached storage (NAS) device that is used by multiple clients to store data and run applications. Physical volume 100 may also be a local physical volume, such as a local desktop's C:\ drive.

Snapshot 102 is a snapshot of physical volume 100 taken by a native snapshot program. A native snapshot program is a snapshot program that is fully supported by the vendor of the operating environment running on the physical volume. For example, in some embodiments, physical volume 100 is running a Microsoft environment, the native snapshot program would be Volume Shadow Copy Service (VSS). Various linux providers also have their own native snapshot program. Once Snapshot 102 is taken, or created by the native snapshot program, it may be stored on physical volume 100. In some embodiments, the snapshot may be stored on a remote storage device (not shown in FIG. 1).

Once snapshot 102 is created by a native snapshot program, snapshot 102 is read block by block and written, or transferred, to deduplicated virtual storage device 104. The format of the written data on deduplicated virtual storage device 104 may vary. In some embodiments, the vmdk format is used. VMDK is a popular virtualization format developed by VMWare, Inc. In some embodiments, a blank vmdk container is created, and then populated block by block as snapshot 102 is read. Other virtualization formats may be used. For example, in some embodiments, Microsoft's virtualization format may be used.

In the case of a new full backup, a blank virtual container (e.g. a blank vmdk file) is created before transferring the blocks from the snapshot. In the case of an incremental backup, a parent vmdk file is identified before transferring the blocks from the snapshot to form a child vmdk file.

In some embodiments, deduplicated virtual storage device 104 may be a physical storage device, such as Data Domain Restorer, a product provided by EMC Corporation. This physical storage device stores deduplicated data, and the deduplicated data includes virtual files (e.g. vmdk files).

Since the virtual container (the .vmdk file in the above example) is stored on a deduplicated storage device, data system 10 may realize significantly less storage and network bandwidth consumption. For example, snapshot 102 may have several redundant blocks. This may occur when multiple files share common block(s). Instead of sending the same block multiple times over the network, various deduplication techniques may be used to send only a single instance of the block over the network. Such deduplication techniques may include calculating a hash of a block, determining if deduplicated virtual storage device 104 has the hash (usually by checking a deduplication index), sending the block to deduplicated virtual storage device 104 if it doesn't have the hash, and adding the hash to the deduplication index. In some embodiments, deduplication programs, such as DDBoost provided by EMC Corporation, may be used.

In addition to source side deduplication described above, target side deduplication may be implemented. Target side deduplication typically involves transferring all the data to a target, and performing deduplication after all the data has been sent. This is different from source side deduplication, which typically involves determining which blocks the target already has, and transferring only those blocks that the target does not have.

By using a combination of native snapshot technology, virtualization, and deduplication, a full mountable virtual image (backup) may be created and stored on a storage device.

Figure 2:
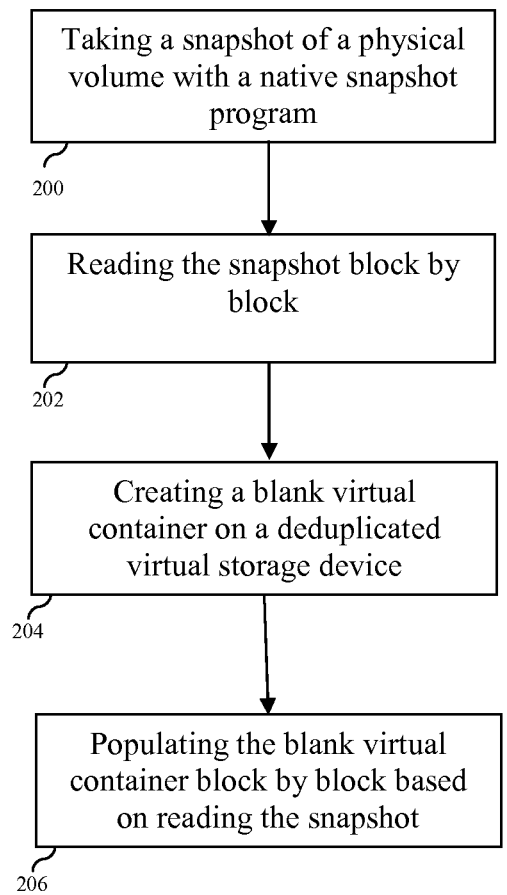
FIG. 2 is a flowchart of a method to protect data in accordance with some embodiments.

FIG. 2 illustrates a method to protect data in accordance with some embodiments. In step 200, a snapshot of a physical volume is taken with a native snapshot program. In step 202, the snapshot is read block by block. In step 204, a blank virtual container is created on a deduplicated virtual storage device. In step 206, the blank virtual container is populated block by block based on reading the snapshot. In some embodiments, populating the blank virtual container includes writing, or transferring, only unique blocks (e.g. blocks that the deduplicated virtual storage device does not have).

The above method may be used to create full backups. The enhanced techniques described herein may also be used to create incremental backups.

Similar to the full backup, an incremental backup may begin by taking a snapshot of a physical volume. In some embodiments, a change block tracker may be used to determine which blocks have changed since a certain point in time (e.g. a previous backup). This may be a kernel component in some embodiments, and the changed blocks may be tracked using a bitmap. In some embodiments, after the change block tracker has determined the changed blocks, a child vmdk may be created and populated with the changed blocks and linked to its parent vmdk. This process may be repeated, resulting in a parent vmdk having multiple child vmdks.

Figure 3:
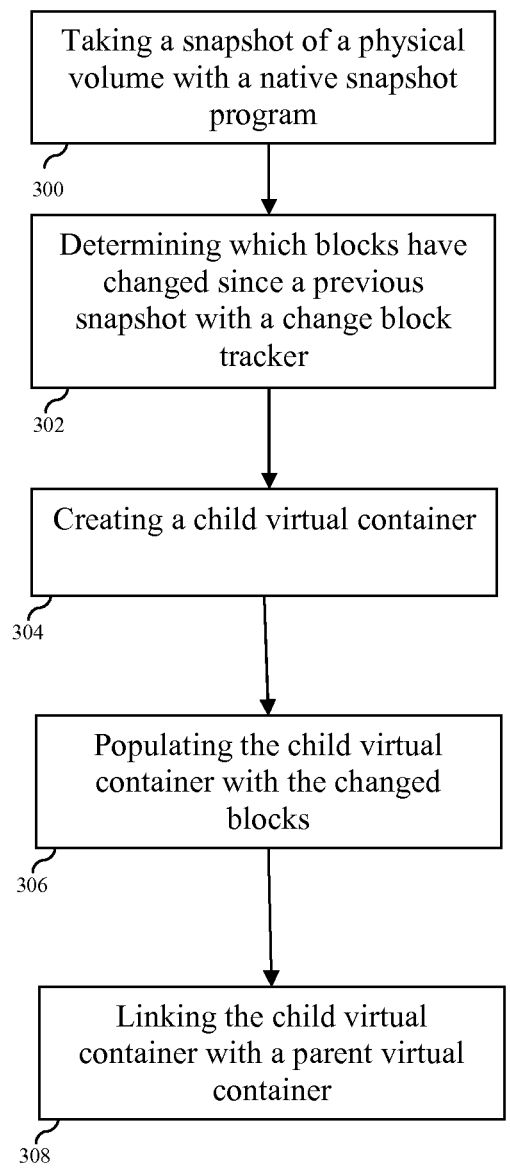
FIG. 3 is a flowchart of a method to protect data in accordance with some embodiments.

FIG. 3 illustrates a method to protect data in accordance with some embodiments. In step 300, a snapshot of a physical volume is taken with a native snapshot program. In step 302, a change block tracker determines which blocks have changed since a previous snapshot. In step 304, a child virtual container is created. In step 306, the child virtual container is populated with the changed blocks. In step 308, the child virtual container is linked with a parent virtual container.

In some embodiments, it may be preferable to consolidate or synthesize a new full backup from an old full backup and its incremental backups. This may be due to performance reasons (a restore does not have to walk through a series of incremental backups), or retention policies (corporate policy determining a set amount of restore points), among others. Many virtualization products allow users to consolidate incremental backups or deltas. For example, VMWare allows users to consolidate delta vmdks. Deduplication technology may be used in some embodiments to increase the speed of the consolidation. For example, in some embodiments, a "fast copy" of a block can be created quickly by creating a pointer to the block. Data Domain's fast copy feature may be used in some embodiments to quickly create a copy of a block.

Figure 4:
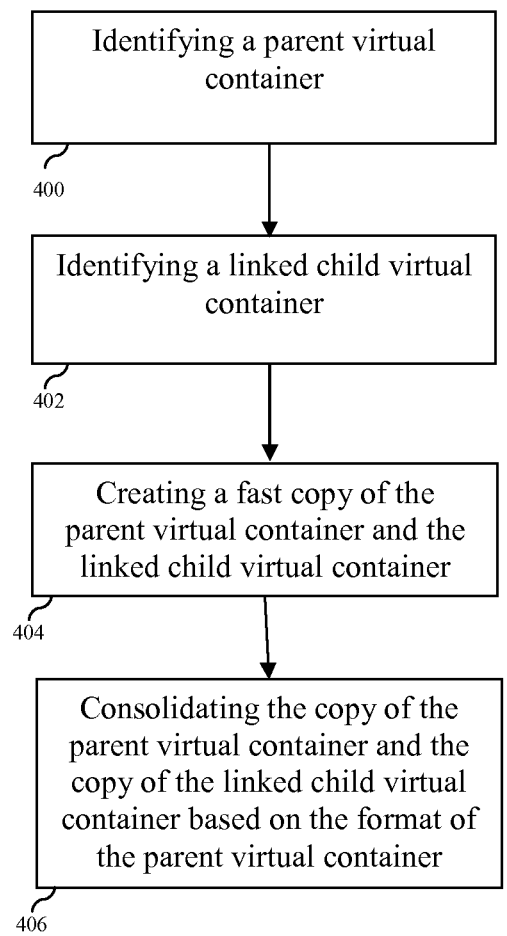
FIG. 4 is a flowchart of a method to protect data in accordance with some embodiments.

FIG. 4 illustrates a method to protect data in accordance with some embodiments. In step 400, a parent virtual container is identified. In step 402, a linked child virtual container is identified. In step 404, a fast copy of the parent virtual container and the linked child virtual container are created. In step 406, the copy of the parent virtual container and the copy of the linked child virtual container are consolidated based on the format of the parent virtual container. For example, if the parent virtual container is in vmdk format, VMWare's consolidation tools may be used. After the virtual containers are consolidated, the original virtual containers (parent and child) may be removed. This removal may be due to corporate retention policies or performance reasons, as described above.

In some embodiments, the deduplicated virtual storage device is disk. Disk provides several benefits compared to tape, such as cost of storage and speed of backup or recovery. In addition, disk allows the vmdk (or other virtual file format) to be mounted locally (e.g. the deduplicated virtual storage device). In some embodiments, Virtual Disk Development Kit (VDDK), a product provided by VMWare, Inc, may be used.

Though disk provides many benefits, some users may still wish to store a backup on tape. In such cases, the vmdk file can be mounted as discussed above, and the mounted image may be backed up to tape using a disk to tape backup application, such as Networker, a product provided by EMC Corporation.

In some embodiments, there may be multiple physical volumes in data system 10. Further, the number of physical volumes may be dynamic. For example, an IT administrator may add several physical client machines to a corporate network, or may remove physical application servers from the network. To keep track of the configuration of the network, a virtual appliance may be attached to a router or other switch that handles all of the network's traffic. The virtual appliance may contain a database, which contains the details of all the physical volumes in the network. For example, the database may contain the IP address of each physical machine, and the number of physical volumes on each machine. The virtual appliance may also scan the packets that pass through the router to determine metadata, such as source IP address and MAC address, among others. In some embodiments, the virtual appliance may use a passive approach, and query the router for how many machines are attached at a given time, instead of actively searching the packets.

Once a new physical machine or volume has been identified, the virtual appliance may begin the methods described above to create a virtual backup. In some embodiments, a program (or agent) may be pushed out to the newly identified physical machine to assist with the block level transfer, such as by identifying which blocks are already on the deduplicated virtual storage device and only transferring unique blocks.

In some embodiments, the virtual appliance may be a physical storage device with software installed to monitor network traffic going through a router. The virtual appliance may be used to store the virtual containers, or the virtual containers may be stored in a separate deduplicated virtual storage device. The database may be stored locally on the virtual appliance, or the database may be stored on a remote location and separate from the virtual appliance.

Figure 5:
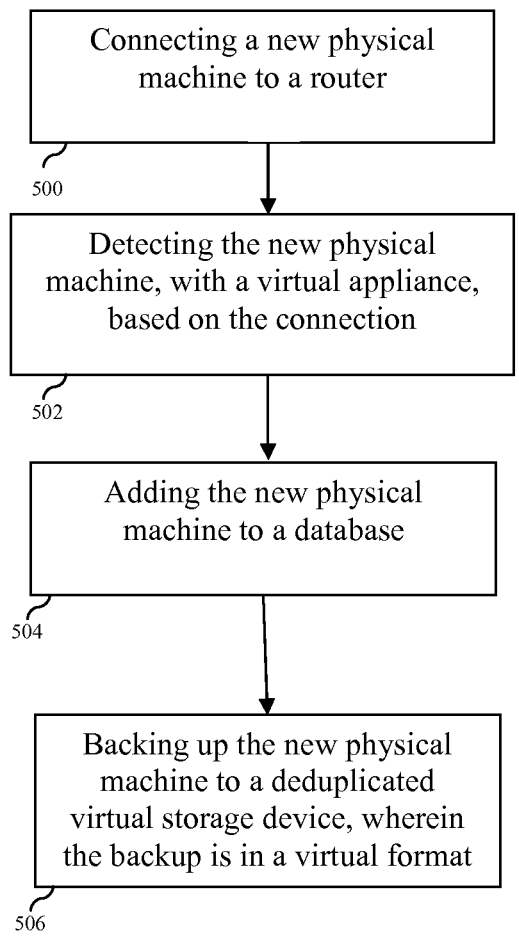
FIG. 5 is a flowchart of a method to protect data in accordance with some embodiments.

FIG. 5 illustrates a method to protect data in accordance with some embodiments. In step 500, a new physical machine is connected to a router. In step 502, a virtual appliance detects the new physical machine based on the connection. In step 504, the new physical machine is added to a database. In step 506, the new physical machine is backed up to a deduplicated virtual storage device, wherein the backup is in a virtual format.

Once a virtual container has been populated with blocks in accordance with the enhanced techniques described herein, the virtual container may be "mounted" to create a working operating system. For example, if the virtual container was a backup of a Windows machine, the virtual machine may be mounted to the source physical volume (such as in the case of disaster recovery). The virtual container may also be mounted on a remote machine or on the deduplicated virtual storage device itself. This may be preferable when a user wants to browse the virtual container (e.g. vmdk file) for specific files or data, and does not want to recover transmit large amounts of data (e.g. the whole image) over a network connection.

In some embodiments, a user may be given the option to mount a child vmdk or a parent vmdk. This allows a user to choose between multiple restore points. For example, suppose a full backup was taken on Monday, an incremental on Tuesday, another incremental on Wednesday, and yet another incremental on Thursday. If on Friday the physical volume crashed, a user may use the deduplicated virtual storage device to identify several restore or recover points. In some embodiments, a user may use VMWare products to identify a parent vmdk and all linked child vmdks. Upon selecting the appropriate restore point (e.g. vmdk), a restore process would "walk through" until the selected restore point. For example, if the user wanted to restore the Wednesday incremental, the restore process would walk through the full backup, the Tuesday incremental, and finally the Wednesday incremental.

Figure 6:
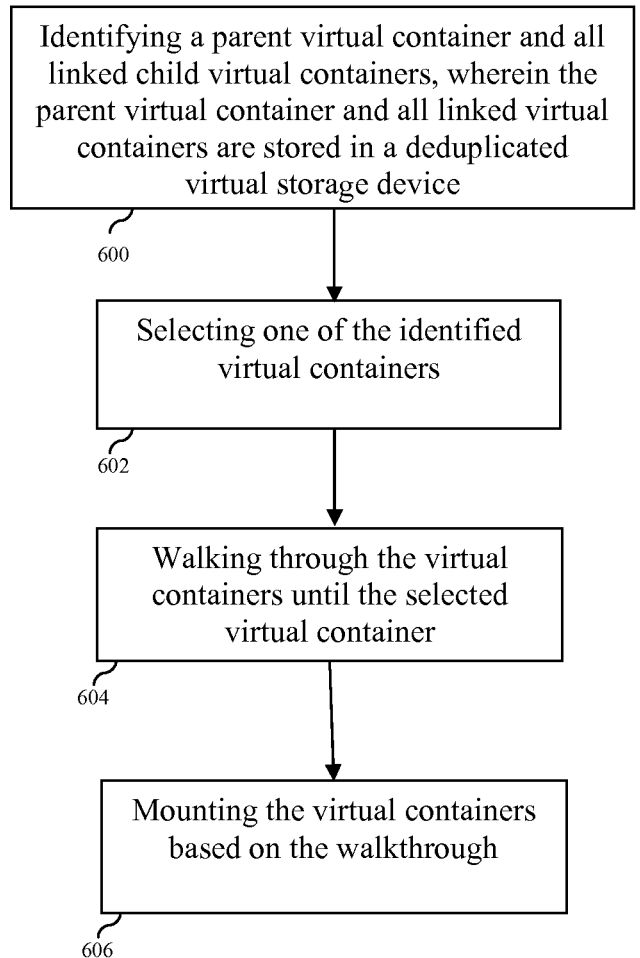
FIG. 6 is a flowchart of a method to protect data in accordance with some embodiments.

FIG. 6 illustrates a method to protect data in accordance with some embodiments. In step 600, a parent virtual container and all linked child virtual containers are identified, wherein the parent virtual container and all linked child virtual containers are stored in a deduplicated virtual storage device. In step 602, one of the identified virtual containers is selected. In step 604, the virtual containers are walked through until the selected virtual container. In step 606, the virtual containers are mounted based on the walkthrough. In some embodiments, the virtual containers are mounted on the deduplicated virtual storage device. In some embodiments, the virtual containers are mounted on a remote storage device, such as the physical volume that was the source of the virtual containers. In some embodiments, the virtual containers may be un-mounted after a user has retrieved files from the mount.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for protecting data, comprising:
   taking a snapshot of a physical volume with a native snapshot program;
   reading the snapshot block by block;
   creating a blank virtual container on a deduplicated virtual storage device;
   populating the blank virtual container block by block based on reading the snapshot, wherein the blank virtual container is a parent virtual container;
   tracking block changes to identify changed blocks;
   creating a child virtual container;
   linking the child virtual container to the parent virtual container; and
   populating the child virtual container with the changed blocks.

2. The method as recited in claim 1, wherein populating the blank virtual container includes identifying a redundant block of data and not transferring the redundant block.

3. The method as recited in claim 2, wherein identifying a redundant block of data includes determining a hash of the block, and determining whether the deduplicated virtual storage device has the hash.

4. The method as recited in claim 1, wherein the blank virtual container is a blank virtual file.

5. The method as recited in claim 1, wherein the native snapshot program is Volume Shadow Copy Service.

6. A system for protecting data, comprising a physical volume, a deduplicated virtual storage device, and a processor configured to:
- take a snapshot of the physical volume with a native snapshot program;
- read the snapshot block by block;
- create a blank virtual container on a deduplicated virtual storage device;
- populating the blank virtual container block by block based on reading the snapshot, wherein the blank virtual container is a parent virtual container;
- tracking block changes to identify changed blocks;
- creating a child virtual container;
- linking the child virtual container to the parent virtual container; and
- populating the child virtual container with the changed blocks.

7. A computer program product for protecting data, comprising a computer readable medium having program instructions embodied therein for:
- taking a snapshot of a physical volume with a native snapshot program;
- reading the snapshot block by block;
- creating a blank virtual container on a deduplicated virtual storage device;
- populating the blank virtual container block by block based on reading the snapshot, wherein the blank virtual container is a parent virtual container;
- tracking block changes to identify changed blocks;
- creating a child virtual container;
- linking the child virtual container to the parent virtual container; and
- populating the child virtual container with the changed blocks.

* * * * *